United States Patent

Greenspan et al.

[15] 3,665,402

[45] May 23, 1972

[54] COMPUTER ADDRESSING APPARATUS

[72] Inventors: Lawrence E. Greenspan, Reeds Ferry; Earl J. Whitaker, Amherst, both of N.H.

[73] Assignee: Sanders Associates, Inc., Nashua, N.H.

[22] Filed: Feb. 16, 1970

[21] Appl. No.: 11,634

[52] U.S. Cl. ..........340/172.5

[51] Int. Cl. ..........G06f 9/20, G05b 1/01

[58] Field of Search ..........340/172.5

[56] References Cited

UNITED STATES PATENTS

| | | | |
|---|---|---|---|
| 3,105,143 | 9/1963 | Hosier et al. | 340/172.5 |
| 3,153,775 | 10/1964 | Marsh | 340/172.5 |
| 3,239,816 | 3/1966 | Breslin et al. | 340/172.5 |
| 3,239,820 | 3/1966 | Logan et al. | 340/172.5 |
| 3,247,490 | 4/1966 | Kregness et al. | 340/172.5 |
| 3,297,997 | 1/1967 | Grady et al. | 340/172.5 |
| 3,297,998 | 1/1967 | Klein | 340/172.5 |

*Primary Examiner*—Paul J. Henon
*Assistant Examiner*—Jan E. Rhoads
*Attorney*—Louis Etlinger

[57] ABSTRACT

Operand list control apparatus for controlling the repeated execution of an instruction on a specified number of operands. The contents of an execution status register is updated at the conclusion of each execution of the instruction. The updated execution status field is then compared with a termination status field. On disagreement thereof, the repetitive execution of the instruction continues. However, upon agreement of the termination and execution status fields, the repetitive execution of the instruction is interrupted by returning control to the program addressing means.

3 Claims, 5 Drawing Figures

INVENTORS
EARL J. WHITAKER
LAWRENCE E. GREENSPAN
BY Robert R. Hubbard
ATTORNEY

INVENTORS
EARL J. WHITAKER
LAWRENCE E. GREENSPAN
BY Robert R. Hubbard
ATTORNEY

Patented May 23, 1972 3,665,402

3 Sheets-Sheet 3

INVENTORS
EARL J. WHITAKER
LAWRENCE I. GREENSPAN
BY
Robert K. Hubbard
ATTORNEY

COMPUTER ADDRESSING APPARATUS

BACKGROUND OF INVENTION

This invention relates to data processing apparatus and, in particular, to new and improved techniques for addressing data in digital computers of the stored program type.

In stored program computers, instructions or command words are used both to access or address data words (operands), and to control various operations performed on such data words. A typical instruction word includes a plurality of binary bits, some of which are known as the operation code field (OP CODE) and others which are known as the address code or field. The OP CODE identifies a particular operation which the computer is to perform; and the address field identifies the location in the computer memory of the data word upon which the specified operation is to be performed. In some cases, the address field of the instruction word is utilized to identify the address in memory of another instruction word. The performance of a particular job by the computer generally requires a number of such instructions which are arranged in an orderly sequence called a program. That is, the program consists of an orderly sequence of instruction words which are stored in the computer memory.

Stored program computers frequently contain control logic which permits an iterative (repetitive) operation to be performed on a list of operands. For example, one or two instruction words have been employed to provide an OP CODE, and the starting and ending addresses of the operand list or an OP CODE, a starting address, and the number of operands. Such a provision is advantageous in that the repetitive addressing of a single instruction for each address is avoided, thus saving both machine time as well as memory space. Generally, such control logic has provided for the uninterrupted performance of the operation on each operand in the list. That is, a counter is incremented or decremented by one as each iteration is completed. When the count becomes equal to a reference (usually zero) all of the iterative operations have been completed. The next instruction in the program sequence is then addressed and the running of the program continues.

Programs often require that the choice of the next instruction word to be employed be dependant upon the occurrence of a particular condition. This is sometimes called branching or jumping. In general, the determination of the branching choice requires a series of instructions which test for the particular condition. If the particular condition should occur during an iterative operation on an operand list in a prior art computer of the type described above, all iterations would have to be completed on the entire list before the test instructions could be employed. This, of course, results in wasted machine time for performing unnecessary operations.

BRIEF SUMMARY OF INVENTION

An object of the present invention is to provide new and improved computer apparatus.

Another object of the present invention is to provide new and improved digital apparatus for controlling repetitive operations which are performed on a list of operands.

Still another object of the present invention is to provide operand list control logic which is operative to terminate the execution of iterative operations upon the occurrence of predetermined conditions prior to normal depletion of the list.

Briefly stated, apparatus embodying the present invention is intended for use in a computer equipment having a memory, a program addressing means for fetching instructions from the memory and an operand list control apparatus for inhibiting the operation of the program addressing means while one of the instructions is repetitively executed on a list of operands. The apparatus which embodies the invention includes a first means for fetching the operands. Also provided is a means responsive to each execution of the instruction to provide an execution status field. Another means provides a termination status field. A means responsive to the execution and termination status fields terminates the repetitive execution of the instruction by enabling the program addressing means whenever there is agreement of the termination and execution status codes.

DESCRIPTION OF PREFERRED EMBODIMENT

Operand list control apparatus embodying the present invention may be employed to repetitively perform upon a list of operands many different types of operations such as ADD, COMPARE, EXCLUSIVE OR, and others. According to the present invention, an iterative operation is commenced by an EXECUTE and REPEAT (EXR) instruction which includes a terminating status code (TSC) and the address of an object instruction, for example, the COMPARE instruction. The object instruction is then fetched and is repetitively performed upon a list of operations. The result of each operation is tested to provide an execution status code (ESC) which is compared with the terminating status code. If there is disagreement, execution of the object instruction continues. If the entire list is depleted without a positive comparison, then the next sequential instruction calls a subroutine Y. On the other hand, if the TSC and ESC agree, execution of the object instruction is stopped and the program counter is incremented to the second instruction after the EXR instruction. This instruction calls a subroutine Z.

A significant advantage of the operand list control apparatus is that several software functions are eliminated, thereby saving memory space and reducing program execution time. For example, the incrementing and testing of an index register, branching and testing for stop conditions are all accomplished by the operand list control apparatus rather than by software instructions.

Referring now to the flow diagram of FIG. 1, the invention will first be described in terms of its flow of operation with respect to the exemplary instruction word formats shown in FIGS. 2A, 2B and 2C. It is to be understood, however, that other instruction word formats may be employed without departing from the embodiments of the present invention. For the purpose of this description, it is assumed that the program has been loaded into the computer memory and that it is currently running. The program instructions are located at consecutive addresses in memory and the next instruction is the one at address P.

Figure 1:
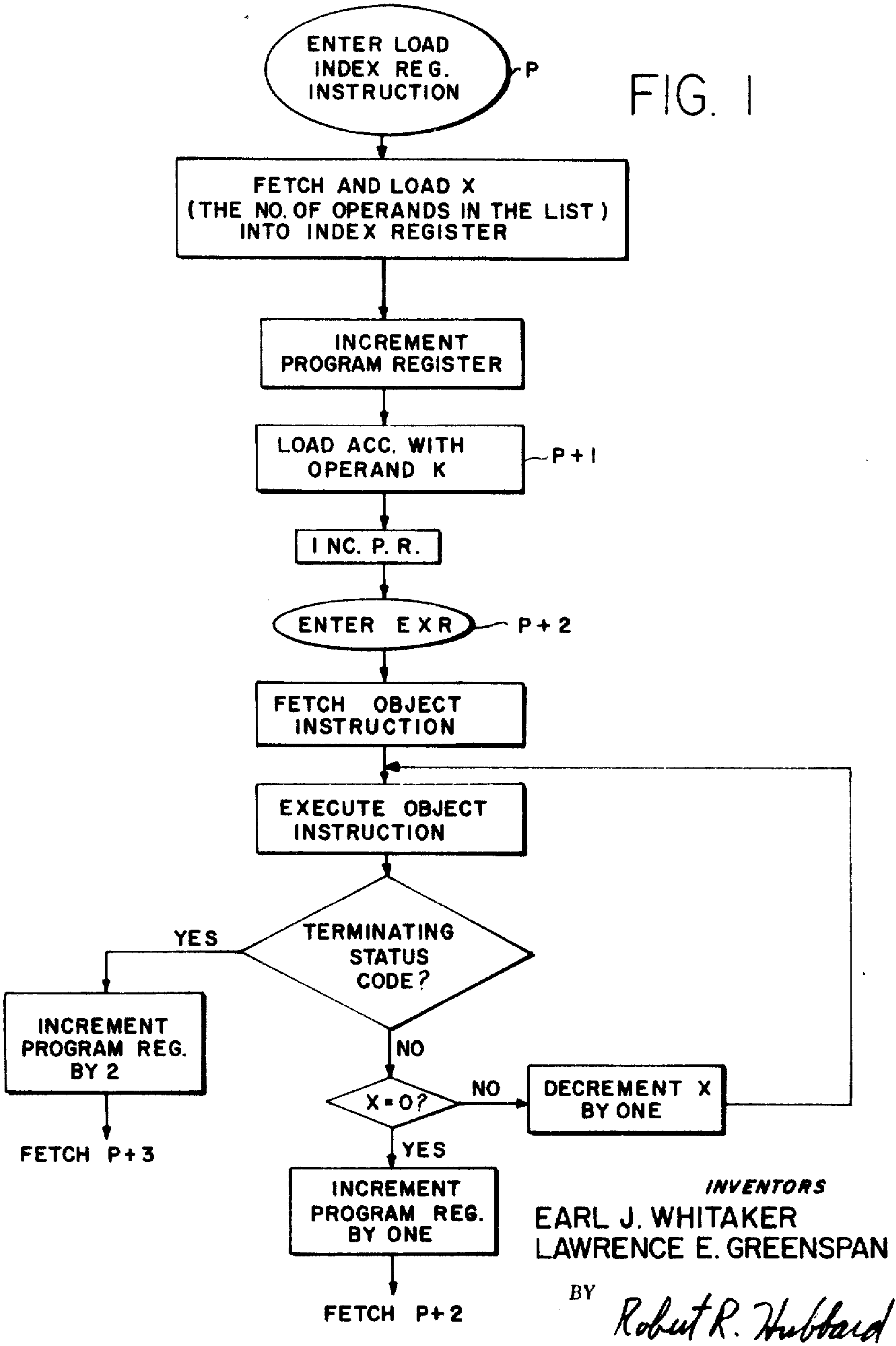
FIG. 1 is an operational flow diagram of operand list control techniques embodying the invention.
Figure 2A:
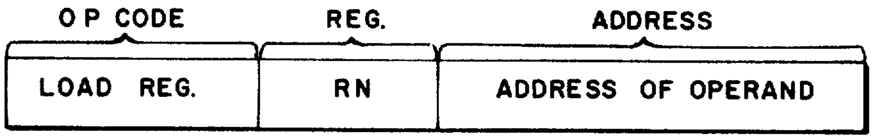
FIGS. 2A, 2B and 2C illustrate typical instruction word formats which may be employed in the embodiments of the invention.

As illustrated in FIG. 1, the instruction located at address P is a command to load a number X into a specific index register, the value of X being indicative of the number of operands in a list. In FIG. 2A, the format of the LOAD INDEX instruction is a typical register load type which contains an OP CODE portion, an index register select portion and an address portion. The binary bits of the OP CODE portion are used to control the execution of the operation (LOAD INDEX) to be performed on the data word (X) indicated by the address portion. Typically, the index portion identifies a particular one of a group of index registers. The number contained in this particular index register is then employed to modify the address (base address) identified in the address portion. For example, if the base address is 100 and the number contained in the specified index register is 50, the word which will be addressed has an address equal to the sum of the base address and the index number or an address of 150.

As illustrated in FIG. 1, the LOAD INDEX instruction is entered (into the machine's instruction register) and then executed by transferring X from its specified memory location to the specified index register. The program register is then incremented to a value of P+1. The instruction located at address P+1 is then fetched. This instruction is another register loading instruction namely, LOAD ACC, having a format similar to that shown in FIG. 2A. That is, the LOAD ACC instruction specifies the address of an operand K which is to be loaded into a specified accumulator under control of its OP CODE. After execution of LOAD ACC, the program register is again incremented, to P+2.

Figure 2B:
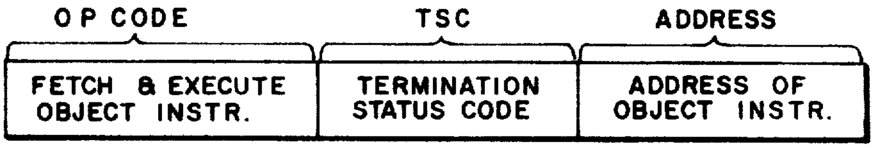

This instruction, herein called EXECUTE and REPEAT, has the format shown in FIG. 2B. The OP CODE specifies that the object instruction located at the address identified in the address portion be fetched and executed. The EXECUTE and REPEAT instruction also contains a portion which specifies a termination status code (TSC). The field of the TSC code essentially specifies a condition or conditions, the occurrence of which will terminate the iterative operations called for by the object instruction.

Figure 2C:
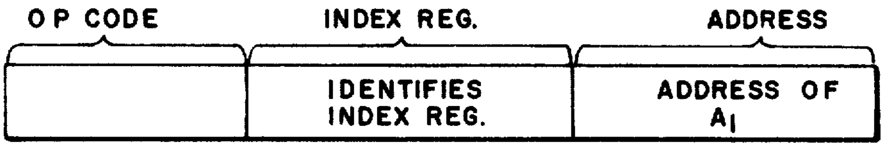

The object instruction format, shown in FIG. 2C, contains the address of the first operand of the list, A1. The index portion specifies that the index register containing X is to be employed to modify the address. Thus, when the first operand is fetched, it will have an address equal to the sum of A1's address and the value X. Assuming $X=N$ (N being the number of operands in the list), the first operand to be fetched is $A_N$.

Referring again to FIG. 1, the object instruction is fetched and then repetitively executed for each operand $A_1$ through $A_N$ in the manner shown by the illustrated loop. As each operand is operated on the result is automatically tested against the TSC. If the specified condition should occur at any time, (e.g., equivalence for the object instruction COMPARE), control is taken from the loop. The program register is incremented by 2 and the instruction at address P+4 is fetched. If the specified TSC condition does not occur, the loop retains control to decrement the $X$ value and operate on the next operand. When the value of $X$ has been decremented to zero, the last operand A1 of the list is fetched and operated on. Since $X$ is now zero (normal depletion of the list), control passes from the loop. The program register is incremented by one to a value of P+3 and the instruction located thereat is fetched. In keeping with the present example, the instructions at memory addresses P+2 and P+3 might be instructions which call for the previously mentioned subroutines Y and Z, respectively.

Figure 3:
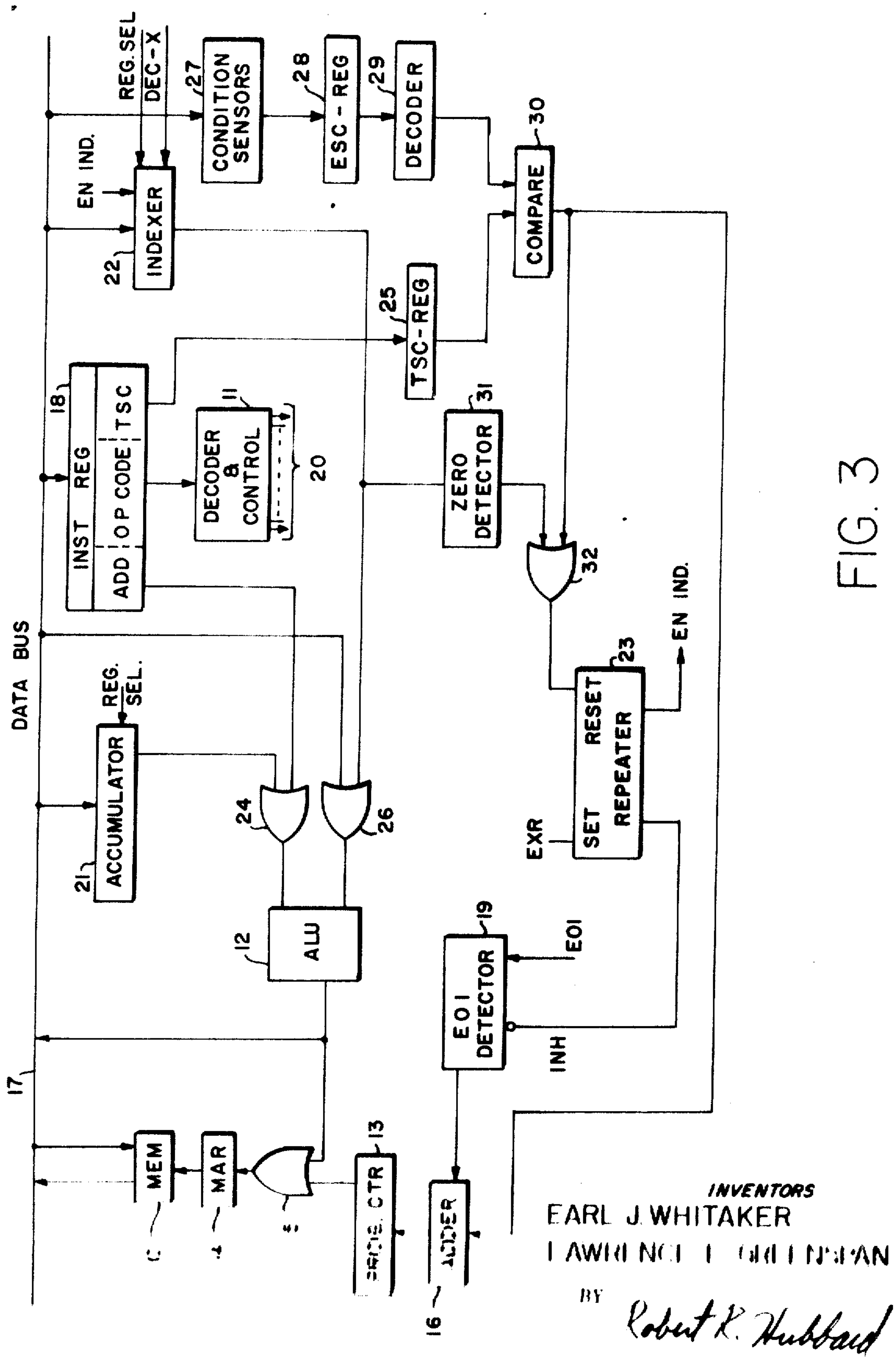
FIG. 3 is a block diagram in part and a logic diagram in part of a portion of the digital computer which illustrates operand list control apparatus embodying the invention.

Referring now to FIG. 3, operand list control apparatus embodying the invention is illustrated with a number of blocks containing known circuits which are actuated by bi-level electrical signals applied thereto. When the signal is at one level, it represents the binary digit "one", and when it is at another level, it represents the binary digit "zero". For the sake of the discussion which follows, it may be assumed that a high level signal represents the binary digit "1" and a low level signal, the binary digit "0". Also, to simplify the discussion, rather than speaking of an electrical signal being applied to a block or logic stage, it is sometimes stated that a "1" or a "0" is applied to the block or stage.

Also in FIG. 3, buses and data flow paths are illustrated as single lines. However, it is to be understood that each such bus or path may consist of a large number of conductors. For example, the DATA BUS in FIG. 3 consists of a number of conductors equal to the number of bits in a word. In addition, where such a bus or path is applied as an input to a gate, it is assumed that the gate actually consists of a number of gates equal to the number of bits carried by the bus or path, such that each bit is applied to a different gate.

In FIG. 3, there is shown a portion of a digital computer which includes the operand list control apparatus embodying the present invention. The illustrated portion of the computer includes a memory 10, an Arithmetic Logic (ALU) section 12, and various registers and gates which are employed in the fetching of instruction and data words from memory 10 and in the execution of the instructions. The memory 10 may be of the magnetic core or any other well known type. In keeping with the example adopted for FIGS. 1 and 2, instruction words and data words are already loaded into the memory in the form of a currently running program.

The address P of the LOAD INDEX instruction is specified by a program counter 13. That is, the program counter 13 contains a digital number P which represents the address or location in memory 10 of the next instruction word (LOAD INDEX). The address P is applied to a memory address register (MAR) 14 by way of an OR net 15. The MAR responds thereto to fetch the instruction word located at address P in memory 10. This instruction word is then applied to a DATA BUS 17 and is directed to an instruction register (IR) 18. Associated with the instruction register 18, although not shown, are a number of gates which are enabled at the appropriate time by the control section 11.

Although not shown but included within the control section 11, is a timing generator and associated control which issue appropriate timing signals for the various gates shown in FIG. 3 at the appropriate times. Control section 11 also includes a decoder which decodes the OP CODE of the instruction word to produce a number of execution signals identified collectively at 20 which are applied to various parts of the computer to control the execution of the operation to be performed. In order to simplify the drawing the connections of these execution signals and of the timing signals issued by control section 11 to the various parts of the computer are not shown.

One of the execution signals 20, (not specifically shown) enables OR gates 24 to pass the address field of the instruction word from the IR register to the MAR register by way of the ALU 12. The data word operand $X$ indicative of the number of operands in the list is addressed from memory 10 and loaded into an indexer 22. The indexer 22 includes several index registers and associated gating and control circuitry. One of execution signals issued by control section 11 is an index register select signal which enables input gates (included within the indexer box 22) at the proper time to pass the $X$ operand to a selected one of the index registers.

When the load instruction has been executed, the control section 11 provides an end of instruction signal EOI to an end of instruction detector 19. The EOI detector, which may suitably be a normally enabled gating net, responds to the EOI signal to provide a signal to an adder network 16. The adder 16 responds thereto to increment the program counter 13 by one. The incremented address number (P+1) is then passed by OR net 15 to the MAR register 14. The instruction word located at the P+1 memory address is another register loading instruction, namely, LOAD ACC. As pointed out previously, the LOAD ACC instruction loads a specified accumulator with a known value K which is stored in the memory 10. The execution of this instruction is quite similar to the execution of the LOAD INDEX instruction except that the register select signal is applied to an accumulator 21, which accumulator may be one of several contained within the computer. When the LOAD ACC instruction has been executed the program counter 13 is again incremented by one to point to the memory address of P+2.

The instruction word located at the P+2 memory address is an EXECUTE and REPEAT instruction which is loaded into the IR register 18. The OP CODE of the EXECUTE and REPEAT instruction is decoded by the control section 11 to provide an execution signal EXR which sets a repeater network 23. One of the outputs (INH) of the repeater network 23 is coupled to inhibit the EOI detector 19 so as to interrupt or inhibit the incrementing of the program counter 13. Another output (EN IND) of the repeater network 23 is coupled to enable the decrementing of the indexer 22. Consequently for the example shown in FIG. 3, the repeater network 23 may take the form of a set/reset flip flop. Also, at this time, the termination status code (TSC) field of the EXECUTE and REPEAT instruction is loaded into a TSC register 25. When these operations have been executed, the address field of the EXECUTE and REPEAT instruction is passed by the OR net 24 and the ALU 12 via OR net 15 to the MAR register 14. As pointed out previously, the address field of the EXECUTE and REPEAT instruction identifies the address of the object instruction, which address may be positioned at any suitable location in the memory 10. The addressed object instruction is then loaded into the IR register 18. As pointed out previously, the index field of the object instruction word identifies which of the registers contained in the indexer 22 is to be employed in the execution of the command. Namely, the index register containing the number $X$ is selected. The number $X$ is coupled from the indexer 22 by OR net 26 to the ALU 12. The address portion of the object instruction word is also coupled to the ALU 12 by OR net 24. The ALU 12 adds these numbers together to produce an address of $A1+X$ which as previously pointed out, is the address of $A_N$. This address of $A1+X$ is then loaded into the MAR 14.

The operand $A_N$ is then fetched from memory 10 and applied to the ALU 12 via OR net 26. The known value K contained in the accumulator 21 is also applied at this time via OR net 24 to the ALU 12. The ALU 12 then performs the operations specified by the OP CODE to provide a resultant output to the data bus 17. A condition sensor 27 senses the executed status of the output of the ALU 12 and responds thereto to provide an execution status code to an ESC register 28. As its name implies, the execution status code indicates the status of the current operation being executed. The execution status code is decoded by a decoder 29 and applied to a comparison network 30 where the current execution status is compared with the termination status field provided by the TSC register 25. In accordance with one embodiment of the invention, the comparator network 30 may take the form of an identity comparator which provides an output signal only when the execution status field and the termination status field are identical or agree. Assuming for the moment that the execution and termination status bits disagree the comparator network 30 does not produce an output signal. A zero detector 31 then tests for the normal depletion of the operand list. To this end, the zero detector 31 is essentially a zero test comparator which compares the contents $X$ of the indexer 22 with zero. The output of the detector 31 is normally a "0" and becomes a "1" only when $X$ equals zero. An OR net 32 senses the outputs of the zero detector 31 and the comparator 30 for a "1" signal. The output of the OR net 32 is applied to reset the repeater 23 and thereby terminate the repetitive execution of the object instruction by reenabling the EOI detector 19 to return control to the program counter 13. Thus, the iterative operation being performed on the operand list can be terminated upon (1) normal depletion of the list by means of a "1" output signal from detector 31, or (2) upon an agreement comparison of the termination and execution status fields by means of a "1" output signal from comparator 30.

So long as the output signals of the comparator 30 and zero detector 31 are "0s", the control section 11 provides a decrement X (DEC-X) signal to the indexer 22 at the termination of each operation. The DEC-X signal is operative to decrement the value of $X$ by one. After the decrementing operation has been performed the new value of $X$ is added to the address A1 to obtain the next operand in the list. For instance, the second operand to be operated upon would be located at the address $A_N-1$.

As previously pointed out, this process continues until either the value of $X$ becomes equal to zero or until the execution status and termination status become identical. Thus, when the list is normally depleted ($X$ equals zero) the output of the zero detector 31 becomes a "1" which acts to reset the repeater and reenable the EOI detector 19 to respond to the end of instruction signal EOI. For this case of normal list depletion, the adder 16 responds to the EOI detector to increment the program counter by one to an address value of P+3. The P+3 instruction is then fetched and the program continues. For the case where the execution and termination status agree, the output of comparator 30 becomes a "1" which acts to reset the repeater 23. The "1" output signal of the comparator 30 also is applied as an input to adder 16. Adder 16 also receives a "1" signal from the reenabled EOI detector 19 so as to provide an incrementing value of two to the program counter 13. Accordingly, the program counter 13 now points to the address of P+ 4. The P+4 instruction is then fetched and the program continues.

As pointed out previously, the object instruction may be any desired command. By way of example for a three variation ESC code, some likely interpretations are given in the TABLE below for the typical object instructions of ADD, COMPARE, and EXCLUSIVE OR.

TABLE

| ESC CODE | ADD | COMPARE | EXCLUSIVE OR |
|---|---|---|---|
| 1 | R=D | A=K | R=all 0's |
| 2 | R ≠ D | A>K | R=all 1's |
| 3 | overflow | A<K | R=mixed 1's & 0's |

In the Table, the parameters R and K stand for result and constant, respectively. The termination status code, of course, can be set for agreement with any one or any combination of the execution status code conditions. Thus, for the COMPARE instruction, if it were desired to compare the operand list with a constant K for equality, the termination status code would be set for agreement with the ESC code 1. On the other hand, for a greater than or equal to test, the termination status code would be set for agreement with the ESC code 1 or 2.

It will thus be seen that the objects as set forth above, among those made apparent from the preceding description, are efficiently attained and, certain changes may be made in the illustrated structures without departing from apparatus which embodies the invention.

It is intended that all matter contained in the above description or shown in the accompanying drawings is primarily illustrative of apparatus embodying the invention.

What is claimed is:

1. Computer apparatus for processing a list of operands, comprising:

- a memory for storing program instructions and a list of operands at addressable locations therein, said instructions including an execute and repeat instruction having an operation field, a terminating status field, and an address field indicative of an object instruction which has an operation field and an address field indicative of the last address in said operand list;
- memory addressing means for addressing said memory locations, said memory addressing means including a program register, the contents of which indicate the current instruction address, said contents being normally changed in value by "one" as each instruction is executed;
- an instruction register for storing each program instruction addressed by said memory addressing means;
- means for executing each instruction stored in said instruction register;
- first register means for storing said terminating status field;
- first means, responsive to an execute and repeat instruction being stored in the instruction register, for loading the terminating status field into said first register means;
- second means, responsive to said execute and repeat instruction stored in the instruction register, for providing
  1. a first control signal which inhibits the normal value changing of the contents of the program register, and
  2. a second control signal which enables an address modifier network;
- said memory address means further including third means, responsive to the address field of said execute and repeat instruction stored in the instruction register, for addressing said object instruction in order to load said object instruction into said instruction register;

means, including said address modifier network, for causing said execution means to repetitively execute said object instruction, when stored in the instruction register, upon each of the operands in said operand list, one by one;

second register means for storing an execution status field indicative of operating conditions at the conclusion of each execution of said object instruction;

fourth means, responsive to each execution of said object instruction, for loading said execution status field into said second register means;

comparison means, responsive to each execution of said object instruction, for comparing the contents of said first and second register means; and termination means, responsive to said comparison means indicating the agreement of said terminating and execution status fields, for terminating the repetitive execution of said object instruction by disabling said first and second control signals.

2. The invention according to claim 1, wherein said address modifier network includes an indexer for holding a number, the value of which is changed upon each execution of said one instruction such that the sum of said value and the address field of said object instruction provides the address of the next operand in the list to be operated upon.

3. The invention according to claim 2 wherein said terminating means includes means for testing the contents of said indexer upon completion of each execution of said object instruction for a condition signifying normal depletion of the operand list, and for disabling said first and second control signals upon normal depletion of the operand list.

* * * * *